US006418250B1

(12) United States Patent
Corbosiero et al.

(10) Patent No.: US 6,418,250 B1
(45) Date of Patent: Jul. 9, 2002

(54) APPARATUS AND METHOD OF MAKING A BLOCKLESS OPTICAL MULTIPLEXING DEVICE

(75) Inventors: Daniel M. Corbosiero, Clinton, MA (US); Karl D. Ehemann, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 24 days.

(21) Appl. No.: 09/630,778

(22) Filed: Aug. 2, 2000

Related U.S. Application Data
(60) Provisional application No. 60/185,319, filed on Feb. 28, 2000.

(51) Int. Cl.[7] .............................................. G02B 6/28
(52) U.S. Cl. ......................... 385/24; 385/34; 385/37; 385/51; 385/52; 359/124; 359/127; 359/130
(58) Field of Search ............................. 385/24, 31, 34, 385/37, 51, 52, 134; 359/124, 127, 130

(56) References Cited

U.S. PATENT DOCUMENTS

| 4,693,544 A | | 9/1987 | Yamasaki et al. | |
|---|---|---|---|---|
| 4,768,849 A | * | 9/1988 | Hicks | ........................ 372/92 |
| 4,824,200 A | | 4/1989 | Isono et al. | |
| 5,005,935 A | | 4/1991 | Kunikane et al. | |
| 5,629,995 A | | 5/1997 | Duck et al. | |
| 5,786,915 A | | 7/1998 | Scobey | |
| 5,859,717 A | * | 1/1999 | Scobey | ........................ 359/124 |
| 5,920,411 A | * | 7/1999 | Duck | ........................ 359/127 |
| 6,198,857 B1 | * | 3/2001 | Grasis | ........................ 385/24 |

* cited by examiner

Primary Examiner—Cassandra Spyrou
Assistant Examiner—Leo Boutsikaris
(74) Attorney, Agent, or Firm—James V. Suggs

(57) ABSTRACT

A blockless optical multiplexing device and a method of making a blockless optical multiplexing device. The blockless optical multiplexing device comprises at least one unit, where that at least one unit is hermetically sealed in a housing. The unit further comprises a substrate that is placed into a base portion of the housing, a plurality of optical filters that are precisely secured onto the substrate, with one half of the optical filters being separated by an air gap from a second half of the optical filters, an input collimator that is mounted onto the substrate, and a plurality of output collimators that are mounted onto the substrate, with a respective one of the output collimators being aligned and associated with a respective one of the optical filters. In a preferred embodiment, the number of optical channels in the optical multiplexing device is equal to the number of the plurality of optical filters secured onto the substrate. Also, in a preferred embodiment, the optical filters are aligned such that a collimated beam of wavelength light is transmitted through a geometric center of each of the optical filters in a cascading path through the air gap of the unit.

29 Claims, 10 Drawing Sheets

APPARATUS AND METHOD OF MAKING A BLOCKLESS OPTICAL MULTIPLEXING DEVICE

CROSS-REFERENCE TO RELATED APPLICATION

This application claims the benefit of U.S. Provisional Application, Ser. No. 60/185319, filed Feb. 28, 2000 entitled APPARATUS AND METHOD OF MAKING A BLOCKLESS OPTICAL MULTIPLEXING DEVICE, which is hereby incorporated by reference.

BACKGROUND OF THE INVENTION

1. Field of the Invention

The present invention relates to optical fiber telecommunication systems and, in particular, to an apparatus and method of manufacturing a blockless optical multiplexing device employed in such telecommunication systems.

2. Technical Background

The high-cost of installing new fiber-optic cable in order to increase the transmission capacity of an existing fiber-optic telecommunication system has given rise to the widespread use of optical multiplexing devices. Such optical multiplexing devices increase transmission capacity of a single fiber-optic waveguide by employing optical multiplexing techniques, such as, wavelength division multiplexing (WDM). WDM allows multiple different wavelengths to be carried over a common fiber-optic waveguide. Presently preferred wavelength bands for fiber-optic transmission media include those centered at 1.3 micrometer and 1.55 micrometer. The latter, with a useful bandwidth of approximately 10 to 40 nm depending on the application, is especially preferred because of its minimal absorption and the commercial availability of erbium doped optical fiber amplifiers. WDM can separate/divide this bandwidth into multiple channels. One particular technique of WDM referred to as dense wavelength division multiplexing (DWDM) divides this bandwidth into multiple discreet channels, such as 4, 8, 16 or even 32 channels. By combining and transmitting multiple signals simultaneously at different wavelengths over a single optical fiber transmission line, DWDM in effect, transforms one optical fiber into multiple virtual optical fibers, thus, increasing bandwidth over existing fiber-optic networks and providing a relatively low cost method of substantially increasing telecommunication capacity. One key advantage of a DWDM-based network is that it can transmit different types of traffic/data at different speeds over an optical channel. Accordingly, DWDM-based networks provide an efficient and cheaper way to quickly respond to customers' bandwidth demands and protocol changes.

A prior art optical multiplexing device 200 is shown in FIG. 1. An essential optical component employed in such optical multiplexing devices 200 is an optical bandpass filter 132. As shown in FIG. 1, typically, two or more optical filters 132 are joined together to separate light of different wavelengths transmitted down a common optical waveguide. At a minimum, at least two optical filters are attached adjacent each other on an optical block 120 (as shown in FIG. 1) that has an optical slot 108 passing through the body of the optical block 120, where a collimated beam of light 118 passes through the optical slot 108 of the optical block 120 to each of the optical filters 132. Each of the optical filters 132 transmit light having a different predetermined wavelength and reflects light having other wavelengths. The optical block 120 is made of ceramic, metal (e.g., stainless steel, aluminum, etc.) or preferably, any other nontransparent material. Further, the optical filters 132 are arranged so that an optical beam is partially transmitted and partially reflected by each optical filter, in sequence, producing a cascading (zig-zag) light path.

One significant problem associated with the prior art optical multiplexing devices 200 (shown in FIG. 1) having optical blocks 120 is the expense associated with precisely machining a pair of opposite sides 112 and 114 of an optical block 120, so that the optical filters 132 that are attached to the sides 112 and 114 of the optical block 120 can be mounted and aligned in nearly perfect parallelism to the optical block 120. The prior art design of the optical block 120 had a relatively large area, namely, the sides 112 and 114 that required an optical (mirror) finish. The mirror finish was required in order to mount the filters 132 flat against the optical block 120 in order to maintain parallelism. The relatively large surface area 112 and 114 was required on the optical block 120 because this served as the gluing contact area for the filters 132. It is difficult to maintain a large surface without any pits, scratches or dust to the point that a completely flat surface is maintained. Any surface anomaly tilted the filter out of parallel. To overcome this problem, a microsphere solution was applied to even out the mirror surface during the filter mounting process. Parallelism of the filters 132 to the mounting surface is critical to the optical performance of the optical multiplexing assembly, since it is presumed that every channel will match a specified center wavelength for its transmission bandpass at the same angle of incidence (AOI). The parallelism is measured, typically using an interferometer, and is kept to within 5 fringes at a wavelength of about 650 nm, that is, to within 0.03 degrees relative to the optical block surface. The effect of deviation from parallelism can accumulate as the beam of light travels from one filter to another. For instance, in an assembly consisting of five primary filters, the effect of deviation can result in an AOI error of approximately 0.2 degrees on the last filter in the assembly. Moreover, since the filters are quite small, generally being on the order of 1 to 5 mm in cubic size, difficulties in handling the filters and in precisely mounting the filters onto the optical block, can be time consuming and costly given the uncertainty as to the precise wavelength of a manufactured optical filter. Furthermore, improper mounting of the filters can significantly decrease the optical accuracy and thermal stability of the device.

A related problem of optical multiplexing devices 200 is the gluing of the filters 132 to the respective opposite sides 112 and 114 of the optical block 120 (shown in FIG. 1), where a thermally cured epoxy is applied to the interface between each of the filters 132 and the sides 112 and 114 of the optical block 120. Since the bandpass film in the filters 132 faces the sides 112 and 114 of the optical block 120 containing the optical slot 108, the epoxy tends to interfere with the path of the optical signal, thus, resulting in system degradation. Another limitation of such an optical multiplexing device 200 design is the difficulty in cleaning the bandpass filter 132 surfaces after the filters 132 are attached to the sides 112 and 114 of the optical block 120. Additionally, the precise mounting and gluing of the individual optical filters 132 to the optical block 120 tends to be a lengthy process. In particular, the filters 132 are first attached to one side 114 of the optical block 120 and then the optical block 120 is baked at 60 degrees Celsius for two hour, which secures the respective filters 132 to that one side 114 of the optical block 120. The filters 132 are then inspected for parallelism and flatness to the optical block 120, and any excess glue is cleaned off the filters 132. Next, additional optical filters 132 are mounted onto an opposite side two 112 of the optical block 120 and then the optical block 120 is again baked at 60 degrees Celsius for two hours, which secures the respective filters 132 to that side two 112 of the optical block 120. The filters 132 are then inspected for parallelism and flatness to the optical block 120, and the filters 132 are also cleaned. The optical block 120 is then mounted onto the substrate 125. The optical block 120 and the substrate 25 are baked at 120 degrees C. for another hour. Thus, the curing time can take about five hours of the manufacturing cycle time.

A problem with the design of optical multiplexing devices 200 is that such devices employ optical blocks that are all the same size and, thus, the optical blocks can only accommodate optical filters that are optimized at one tilt angle, for instance, about 5.0 degrees, whereas, the tilt angle at which the collimated light 118 enters the optical block 120 can vary from about 6 to 8 degrees. In particular, the wavelength of light passed by each filter is highly sensitive to two parameters: 1) the angle of incidence between the filter surface and the light beam, and 2) the position of the beam on the filter's surface. To accommodate this design requirement, all filters in one WDM device are pre-selected to function as a "kit", that is, each of the filters operates at one common angle of incidence with respect to each of the respective filter's geometric center point. Accordingly, for such optical multiplexing devices 200, it is not physically possible to hit the geometric center of each of the filters at the proper AOI that is optimized at any angle other than 5.0 degrees.

Another problem associated with the manufacturing of optical multiplexing devices is the finding an optical block material that matches the filters' coefficient of thermal expansion (CTE), which can entail a lot of work, and is not always a success. Further, the optical multiplexing devices tend to be sensitive to polarization dependent losses (PDL) during thermal cycles. In a design where the optical block is bonded at the sides to the thin film coating of the filter, the thin film coating can be extremely sensitive to non-uniform stress induced by the thermal expansion mismatch between the coating and the epoxy as well as that of the material used for the optical block, thus, resulting in high PDL failures.

In light of the foregoing, it is desirable to provide an optical multiplexing device that is cost-efficient without sacrificing reliability in performance. Also, it is desirable to simplify the manufacturing and testing process for optical multiplexing devices and, also, increase line production and reliability with minimal rework. Further, it is desirable to provide a method for making an optical multiplexing device that is overall cost-efficient.

SUMMARY OF THE INVENTION

The present invention is directed to a blockless optical multiplexing device that substantially obviates one or more of the limitations and disadvantages of the related art. The present invention provides a solution to the problems described above relating to the manufacture of optical multiplexing devices. Specifically, the invention provides a blockless optical multiplexing device with N number of different optical channels and a method of making such a blockless optical multiplexing device with N number of different optical channels on one manufacturing line, N being equal to or greater than 2.

To achieve these and other advantages and in accordance with the purpose of the invention, as embodied and broadly described, the invention provides a method of mounting N optical filters onto a substrate, where $N \geq 2$, preferably, $N=4$, more preferably, $N=8$, and most preferably, $N=16$. The method comprises the steps of providing a holding fixture for holding the substrate in a vertical position for assembling each of the N optical filters onto the substrate. The method further comprises removably attaching an alignment fixture onto the substrate, abuttingly aligning each of the N optical filters to the alignment fixture, and securing each of the N optical filters to the substrate, where each of the N optical filters is precisely aligned in parallel with each other. The dimensions of the alignment fixture are customized for the specific angle of incidence of each WDM device to be manufactured. Thus, an array of variously dimensioned alignment fixtures are provided for accommodating each possible angle of incidence for each filter kit employed. The securing step includes abuttingly aligning a first of the N optical filters against a first side of the alignment fixture, where the first of the N optical filters is precisely aligned to directly receive, at a geometric center, a collimated beam of multi-wavelength light at a desired angle of incidence. The securing step further includes applying a curable adhesive to secure a bottom surface of the first of the N optical filters to the substrate, checking the parallelism of the first of the N optical filters to the alignment fixture and curing the curable adhesive. The securing step further includes abuttingly aligning a second of the N optical filters against an opposite second side of the alignment fixture and in parallel with the first of the N optical filters, and applying a curable adhesive to secure a bottom surface of the second of the N optical filters to the substrate, checking the parallelism of the second of the N optical filters to the first of the N optical filters, and curing the curable adhesive. The securing step further includes abuttingly aligning a third of the N optical filters against the first side of the alignment fixture and in parallel with each of the first and second of the N optical filters, applying a curable adhesive to secure a bottom surface of the third of the N optical filters to the substrate, checking the parallelism of the third of the N optical filters to each of the first and the second of the N optical filters, and curing the curable adhesive. The securing step further includes abuttingly aligning a fourth of the N optical filters against the second opposing side and in parallel with each of the first, second and third of the N optical filters, applying a curable adhesive to secure a bottom surface of the fourth of the N optical filters to the substrate, checking the parallelism of the fourth of the N optical filters to each of the first, second and third of the N optical filters, and curing the curable adhesive. Finally, the method further comprises the step of removing the alignment fixture from the substrate, whereby an air gap is created between one half of the N optical filters and a second half of the N optical filters. In a preferred embodiment, the removably mounting step includes removably mounting the alignment fixture onto the substrate with a fastener or a bolt. The method also includes selecting an alignment fixture that is suitable for aligning each of the N optical filters within a desired angle of incidence, and where the first side and the second opposing side of the alignment fixture are substantially parallel to each other. In addition, the checking step includes the step of checking the parallelism of each of the N optical filters with an instrument, preferably, an interferometer. Also, in a preferred embodiment, each of the respective first and third of the N optical filters are abutted against and parallel to each other on one side of the air gap, and wherein each of the respective second and fourth of the N optical filters are abutted against and parallel to each other on an opposite side of the air gap, with the number N of optical filters being equal to the number of optical channels desired. Moreover, in a preferred embodiment, the curable adhesive is an epoxy and each of the curing steps includes exposing the substrate to a high intensity ultra-violet light for preferably approximately 30 seconds.

In another aspect, the invention provides a method of assembling a blockless optical multiplexing device having N sub-assemblies, where $N \geq 1$. The method comprises the steps of removably attaching an alignment fixture onto a substrate of each of the N sub-assemblies, precisely aligning each of a plurality of optical filters in parallel with each other and abutting against either one of two opposite sides of the alignment fixture of each of the N sub-assemblies, preferably, with one half of the plurality of optical filters abutting against one side of the alignment fixture and with the other half of the plurality of optical filters abutting against the other side of the alignment fixture. The method further comprises securing each of the plurality of optical filters to the respective substrate of each of the N sub-assemblies, where each of the plurality of optical filters are precisely aligned in parallel with each other on the respective substrates of each of the N sub-assemblies. The method further comprises the step of removing the alignment fixture from the substrate of each of the N sub-assemblies, such that an air gap is created in between the plurality of optical filters where the alignment fixture originally was attached. The method further comprises the steps of fastening, to the substrate of each of the N sub-assemblies, an input collimator that is aligned to transmit a collimated beam of multi-wavelength light to a first one of the plurality of optical filters, and affixing each of a plurality of output collimators to the substrate of each of the N sub-assemblies, where one of the plurality of output collimators is aligned with respect to an associated one of the plurality of optical filters, preferably, each of the output collimators is positioned behind each of the associated filters. In addition, the method comprises mounting each of the N sub-assemblies onto a main assembly unit, wherein the output end of a preceding one of the N sub-assemblies is optically connected to the input end of a succeeding one of the N sub-assemblies, such that a collimated beam of multi-wavelength light can be transmitted through the air gap and through a geometric center of each of the plurality of optical filters in a cascading path on each of the N sub-assemblies of the optical multiplexing device. In a preferred embodiment, the removably attaching step includes the steps of providing a holding fixture for holding the substrate of each of the N sub-assemblies in a vertical position and further selecting an alignment fixture that is suitable for aligning in parallel each of the N optical filters, such that the collimated beam of multi-wavelength light is incident to the geometric center of each of the plurality of optical filters at a desired angle of incidence. In a preferred embodiment, the desired angle of incidence for each of the filters is the same. Further, in a preferred embodiment, the precisely aligning step includes the steps of applying a curable adhesive to secure a bottom surface of each of the optical filters to the respective substrate, and measuring the parallelism of each of the optical filters in relation to each other, preferably, with an interferometer. Further, in a preferred embodiment, the securing step includes the step of curing the curable adhesive, preferably, by exposing each of the respective substrates to a high intensity ultra-violet light for approximately 30 seconds. In a preferred embodiment, the number N of sub-assemblies in the optical multiplexing device is 4, where each of the 4 sub-assemblies comprises, among other optical components, preferably, 4 optical filters, 1 input collimator and 4 output collimators, thus, providing a blockless optical multiplexing device having a total of, preferably, 16 optical channels.

In a further embodiment, the invention provides a method of making a thin film optical telecommunications multiplexing device having N optical channels, where N is equal to or greater than 2. The method comprises the steps of temporarily attaching an alignment fixture onto each one of a plurality of substrates. For each one of the plurality of substrates, abuttingly aligning one of a plurality of optical filters against one of two opposite sides of the alignment fixture and measuring the angle of incidence that an incident beam of test light makes with the one of the plurality of optical filters on each of the substrates. If a desired angle of incidence is not present, making adjustments to the alignment of the one of the plurality of optical filters. However, if the desired angle of incidence is present, permanently securing the one of the N optical filters to each of the respective substrates. For each of a subsequent one of the plurality of optical filters, repeating the steps of abuttingly aligning the subsequent one of the optical filters against the alignment fixture and measuring the angle of incidence that an incident beam of test light makes with the subsequent one of the plurality of optical filters on each of the substrates. If a desired angle of incidence is not present, making adjustments to the alignment of the subsequent one of the plurality of optical filters. However, if the desired angle of incidence is present, permanently securing the subsequent one of the N optical filters to each of the respective substrates, such that one-half of the plurality of optical filters abut against the one of the two opposite sides of the alignment fixture and the other half of the plurality of optical filters abut against the other of the two opposite sides of the alignment fixture. In a preferred embodiment, for each of the plurality of substrates, the abuttingly aligning step includes the steps of applying a curable adhesive to secure a bottom surface of each of the plurality of optical filters to a respective one of the plurality of substrates. Further, each of the plurality of substrates, the permanently securing step includes the step of curing the curable adhesive by exposing the respective substrates to a 30-second high intensity ultra-violet light. The method further comprises removing the alignment fixture from each of the plurality of substrates after each of the plurality of optical filters are secured to the respective substrates and securing an input collimator onto each of the substrates, where the input collimator is precisely aligned to direct a collimated multi-wavelength light at the desired angle of incidence. In addition, the method includes securing a plurality of output collimators onto each of the substrates, where a respective one of the output collimators is aligned with respect to an associated one of the optical filters, such that the collimated beam of the multi-wavelength light can be transmitted through an air gap and through a geometric center of each of the N optical filters in a cascading path on each of the plurality of substrates. The method further comprises mounting each one of the substrates onto a larger or main substrate, where an output end of a preceding one of the substrates is optically connected to an input end of a subsequent one of the substrates. In a preferred embodiment, the number of optical filters and the number of output collimators on the substrates is equal to the number of optical channels N making up the multiplexing device, preferably, N=4, more preferably N=8, and most preferably, N=16. In a preferred embodiment, each of the substrates have an equal number of optical filters and output collimators, and where the total number of optical filters is equal to the total number of output collimators, which in turn dictates the total number N of optical channels in the multiplexing device.

In yet another embodiment, the invention provides a blockless optical multiplexing device. The blockless optical multiplexing device comprises at least one unit, preferably two units, more preferably three units, and most preferably four units. Each of the units comprises a substrate, an input collimator mounted onto the substrate, a plurality of optical filters precisely secured onto the substrate and a plurality of output collimators mounted onto the substrate, with one half of the optical filters being separated by an air gap from a second half of the optical filters and, with a respective one of the output collimators being aligned and associated with a respective one of the optical filters. In a preferred embodiment, a collimated beam of wavelength light is transmitted through a geometric center of each of the optical filters in a cascading path through the air gap.

DESCRIPTION OF THE PREFERRED EMBODIMENTS

Figure 1:
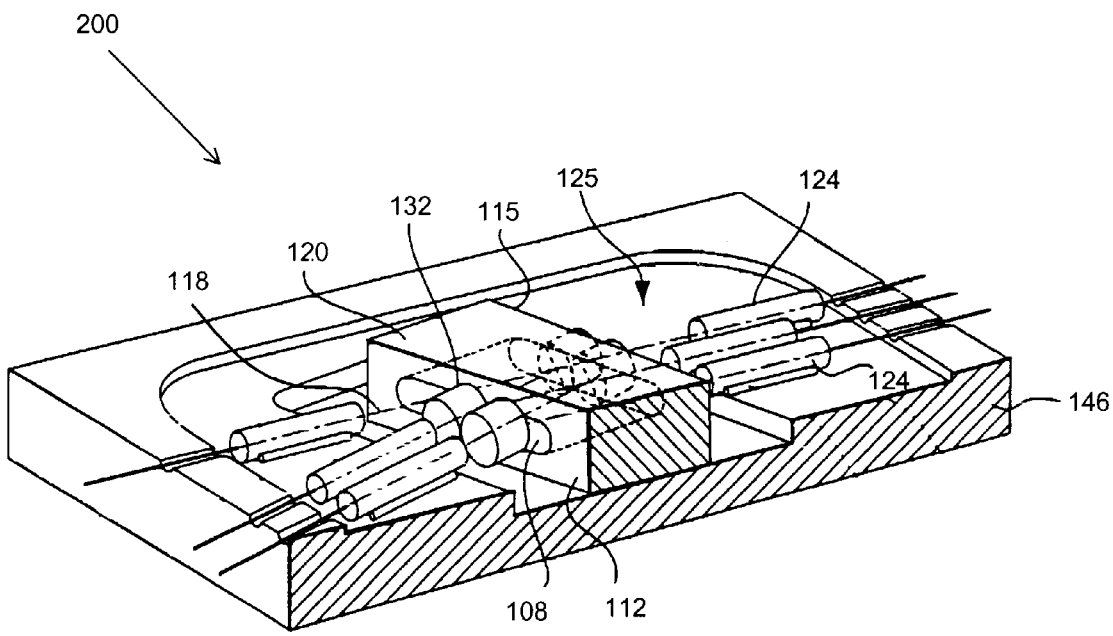
FIG. 1 is a perspective view of a prior art optical multiplexing device.

The invention disclosed herein generally provides an apparatus and a method of making a blockless optical multiplexing device having N optical channels. Although, the description will discuss the manufacture of a blockless optical multiplexing device having four (4) optical channels, the invention provides a method of making a blockless optical multiplexing device having any desired N number of optical channels, with $N \geq 2$, preferably, a blockless optical multiplexing device having 4 optical channels, more preferably 8 optical channels, and most preferably 16 optical channels. As used herein, the term "optical multiplexing device" refers to an opto-electronic device that can serve as either a multiplexer or a demultiplexer. When functioning as a multiplexer, the optical multiplexing device combines or multiplexes two or more optical signals having different wavelengths into a "combined" signal and simultaneously transmits the combined signal in the same direction and over the same optical fiber. On the other hand, when functioning as a demultiplexer, the optical multiplexing device separates or demultiplexes the different optical signals by wavelength and delivers each signal to a particular location. The description will for the most part discuss the demultiplexing functionality of the optical multiplexing device 10. However, those skilled in the art will readily understand the correlative multiplexing functionality. Additionally, the term "optical multiplexing device" is used herein to refer to a larger device that is made up of one or more of the optical multiplexing device shown in FIG. 2.

In a broad aspect, the invention provides a blockless optical multiplexing device. The blockless optical multiplexing device comprises at least one unit, where that at least one unit has a base portion and a cover plate that is secured on top of the base portion to hermetically seal the optical multiplexing device. The unit further comprises a substrate that is placed into the base portion of the housing, an input collimator that is mounted onto the substrate, a plurality of optical filters that are precisely secured onto the substrate, with one half of the optical filters being separated by an air gap from a second half of the optical filters, and a plurality of output collimators that are mounted onto the substrate, with a respective one of the output collimators being aligned and associated with a respective one of the optical filters. In a preferred embodiment, the number of optical channels in the optical multiplexing device is equal to the number of the plurality of optical filters secured onto the substrate. Also, in a preferred embodiment, the optical filters are aligned such that a collimated beam of wavelength light is transmitted through a geometric center of each of the optical filters in a cascading path through the air gap of the unit.

Figure 2:
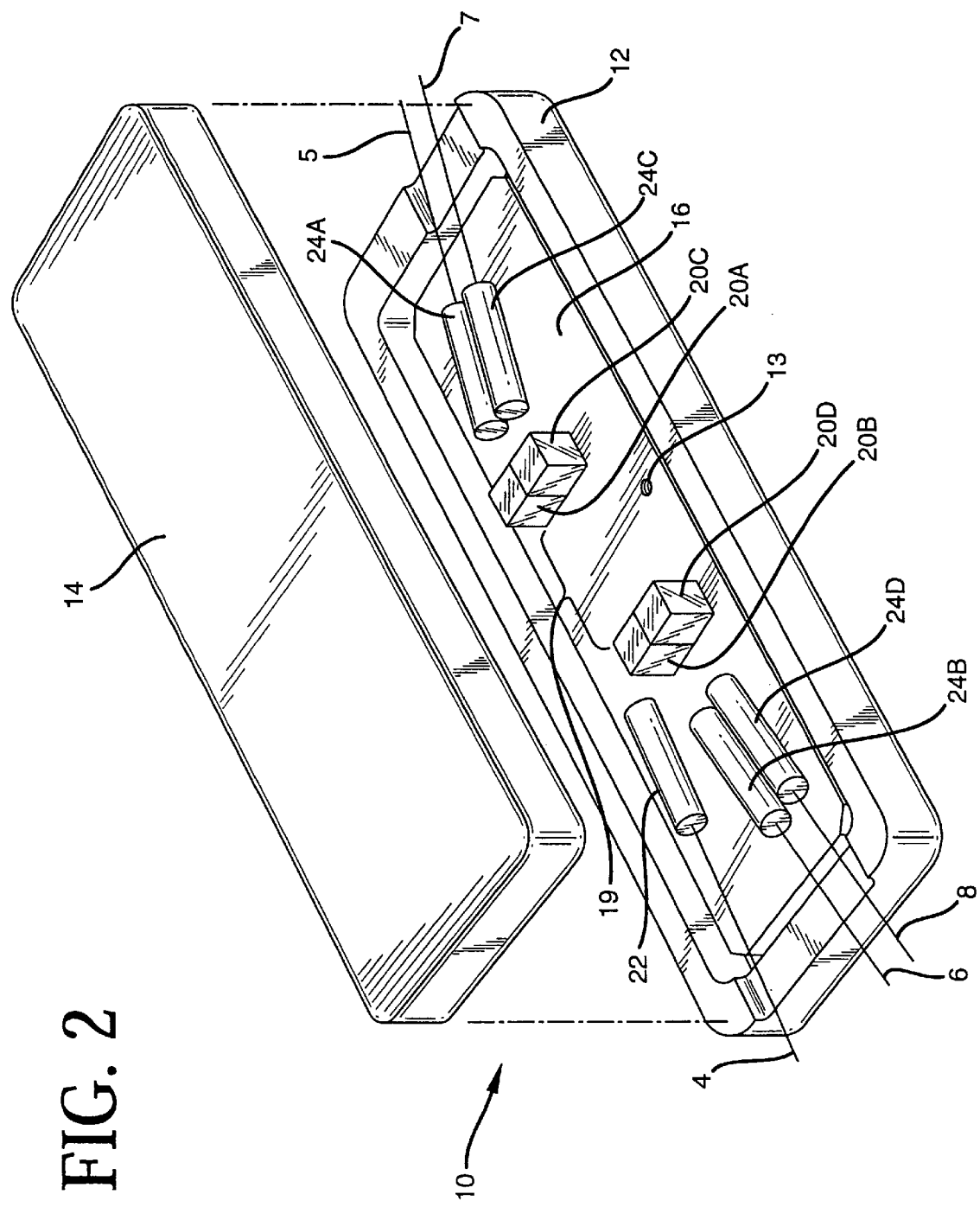
FIG. 2 is a perspective view of a blockless optical multiplexing device in accordance with an embodiment of the present invention, shown inside a housing that includes a base portion and a cover plate.

Turning to the drawings, FIG. 2 shows a blockless optical multiplexing device of the present invention that is comprised of a single unit, which is designated by the reference numeral 10. In FIG. 2, the single unit of the optical multiplexing device 10 includes a housing having a base portion 12 and a cover plate 14 that is secured on top of the base portion 12. Typically, such a single unit optical multiplexing device 10 is disposed within the base portion 12, and the cover plate 14 is hermetically sealed to the base portion 12, as shown in FIG. 2, with the housing being designed to permit the entry and exit of different fiber-optic carrier lines 4, 5, 6, 7 and 8. In particular, notches are provided on two of the narrow opposite sides of the base portion 12, so that the various fiber-optic carrier lines 4, 5, 6, 7 and 8 are not crushed when the optical multiplexing device 10 is hermetically sealed. Further, the different optical components in a blockless optical multiplexing device 10 are mounted onto a substrate 16, which is shown inserted in the housing base portion 12 in FIG. 2. Further, a plurality of optical filters 20 are precisely secured onto the substrate 16, with one half of the optical filters 20A and 20C being separated by an air gap 19 from a second half of the optical filters 20B and 20D, and a plurality of output collimators 24 are mounted onto the substrate 16, a respective one of the output collimators 24 being aligned and associated with a respective one of the optical filters 20.

Figure 7:
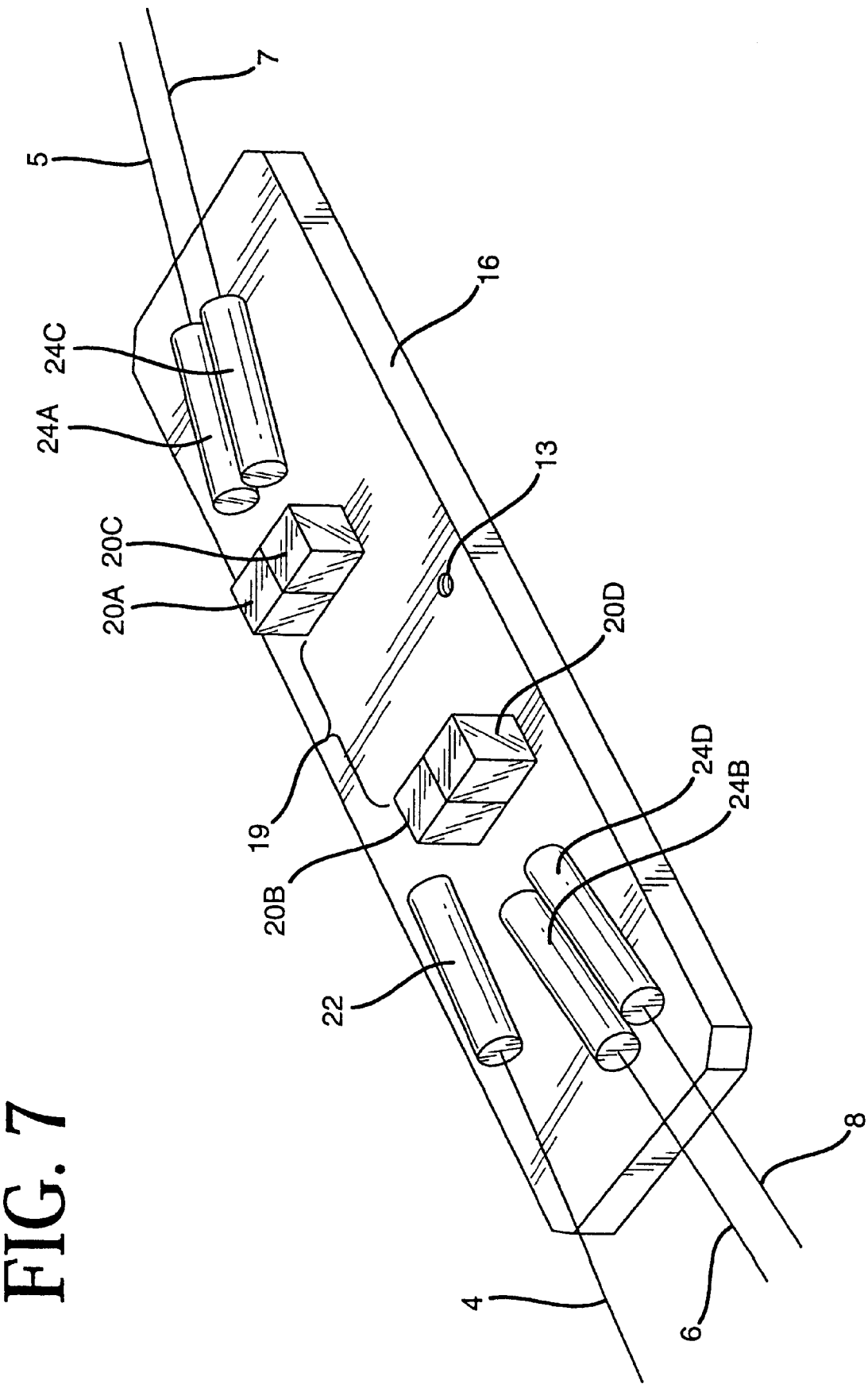
FIG. 7 is a schematic plan view of a substrate showing an input optical collimator and a plurality of output optical collimators secured thereon in accordance with an embodiment of the present invention.
Figure 8:
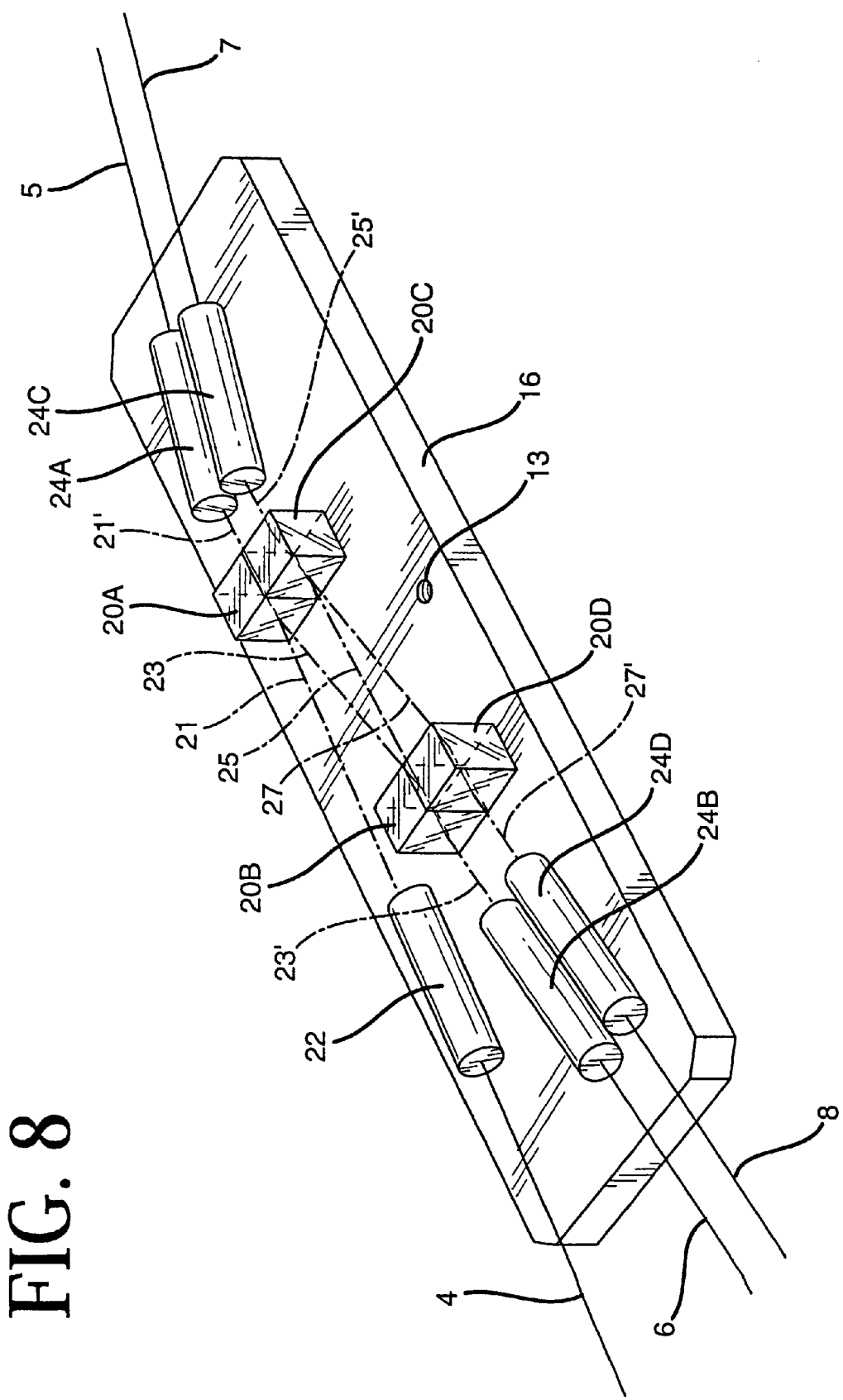
FIG. 8 is a schematic plan view of a blockless optical multiplexing device without the housing, showing the cascading light path in accordance with an embodiment of the present invention.

As shown in FIGS. 2, 7 and 8, a fiber-optic transmission line 4 carrying a multi-channel/multi-wavelength optical signal communicates with an optical device 22, namely, an input optical collimator 22 that includes a fiber-optic gradient index (GRIN) lens that projects a collimated beam of light 21 (shown in FIG. 8). The optical input collimator 22 collimates a multi-wavelength input light and directs a single beam of collimated light 21 at a slight tilt angle, also known as the angle of incidence (AOI), into a series of optical filters 20A, 20B, 20C and 20D, respectively, in a cascading multipoint path, as shown in FIG. 8. Basically, as shown in FIG. 8, the single beam of light 21 first hits optical filter 20A and one wavelength passes through to an associated output collimator 24A that is linked to a fiber-optic channel carrier 5. The optical signal passed through optical filter 20A is a demultiplexed signal that is sent to the first signal channel carrier 5, which is preferably a single-mode optical fiber. Filter 20A is reflective of wavelengths that are not "in-band" of the filter 20A. This reflected light 23 is reflected from optical filter 20A to a second optical filter 20B that is transparent to a different wavelength or sub-range of wavelengths than optical filter 20A. At optical filter 20B, an optical signal corresponding to a second channel is transmitted through the filter 20B to an output collimator 24B associated with filter 20B and from there on to a fiber-optic signal carrier 6. Filter 20B reflects light that is not in-band. Thus, the remaining wavelengths of the initial collimated beam of light 21 is reflected back from filter 20B as reflected light 25 to and through filter 20C to an output collimator 24C that is associated with filter 20C and from there to a signal carrier line 7. Similarly, the light 25 is partially passed and partially reflected as light 27 by filter 20D to an associated output collimator 24D and from there to fiber-optic carrier 8. At each of the filters 20A–D, the light is partially reflected and partially transmitted to a respective one of the associated output collimators 24A–D, each output collimator further communicating with a corresponding one of the signal carriers 5–8 or signal detectors or other destination. Hence, the reflected light cascades in a cascading fashion along a multipoint light path through the air gap 19 (shown in FIG. 8), which is the space between the pair of filters 20A, 20C and pair of filters 20B, 20D. It is crucial that the beam of light hitting the optical filters 20A–D, hit the particular filter in the geometric center at an optimal AOI for the specific set/kit of optical filters 20 employed in the optical multiplexing device 10. The location of the beam on each filter 20 is dependent on the AOI, filter size and spacing between the filters 20, with the AOI being the single largest factor influencing the beam location. If the beam is not centered on an optical filter 20, the particular filter may pass a different wavelength than the wavelength at which the center of the filter was characterized.

Figure 10:
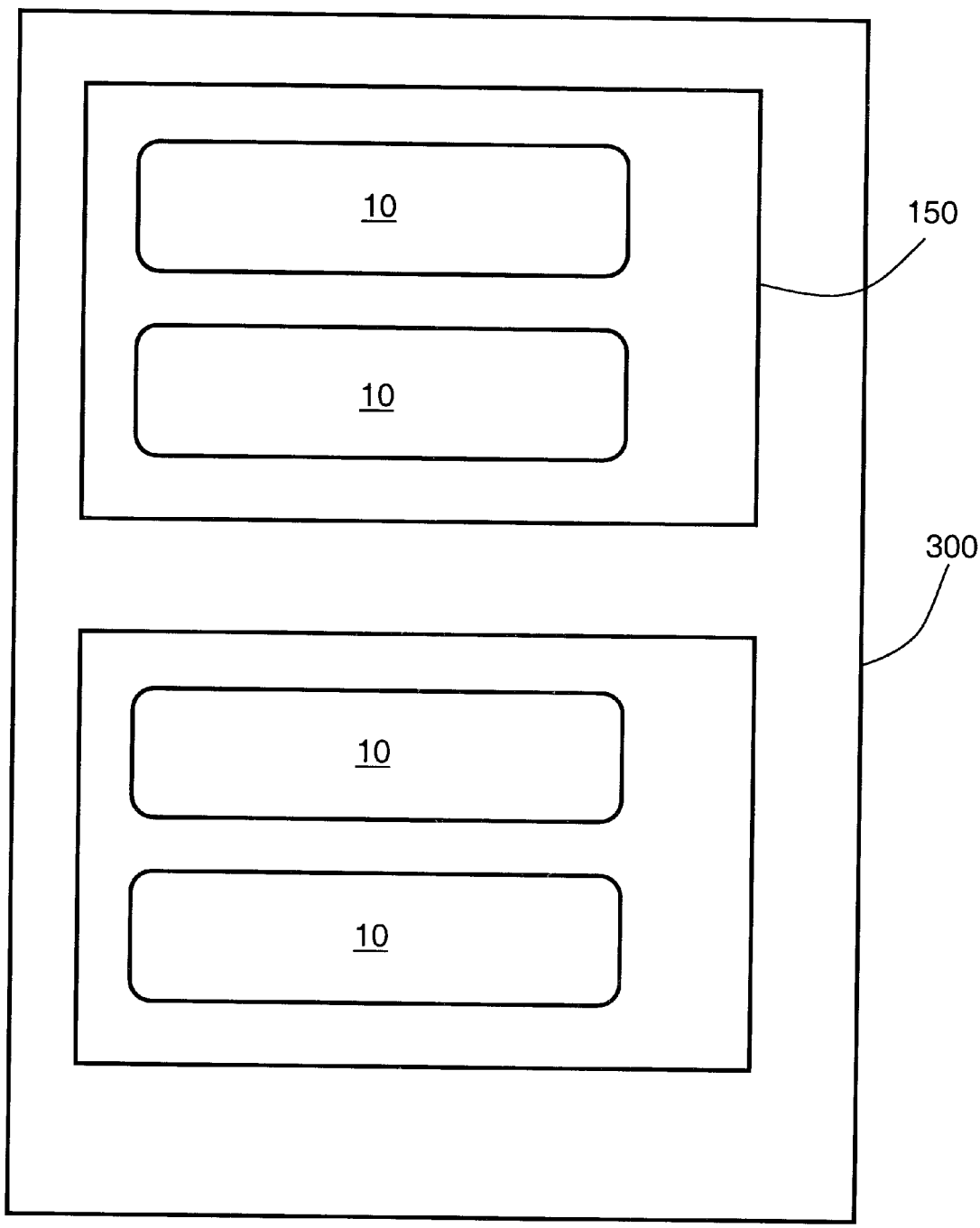
FIG. 10 is a schematic representation of an wavelength-division multiplexer/demultiplexer device that includes several of the optical multiplexing devices in accordance with the present invention.

In a preferred embodiment, the optical multiplexing device 10 is comprised of three additional single units 10, each of the single units 10 being identical in construction to the single unit 10 described above. Moreover, each of the single units 10 is mounted onto a larger or main substrate 150 (shown schematically in FIG. 10), which in turn can be mounted on to even a larger substrate 300 (shown schematically in FIG. 10), wherein an output end of a preceding unit is optically connected to an input end of a subsequent unit (not shown in FIG. 10). Further, in a preferred embodiment, the plurality of optical filters 20 is equal in number to the plurality of the output collimators 24 on the substrate 16 of each of the single units. Also, the number of optical channels in the optical multiplexing device 10, which is made up of one or more single units is equal to the total number of optical filters 20 on all of the units 10 combined, preferably the number of optical channels being 4, more preferably the number being 8 and most preferably the number being 16.

Figure 3:
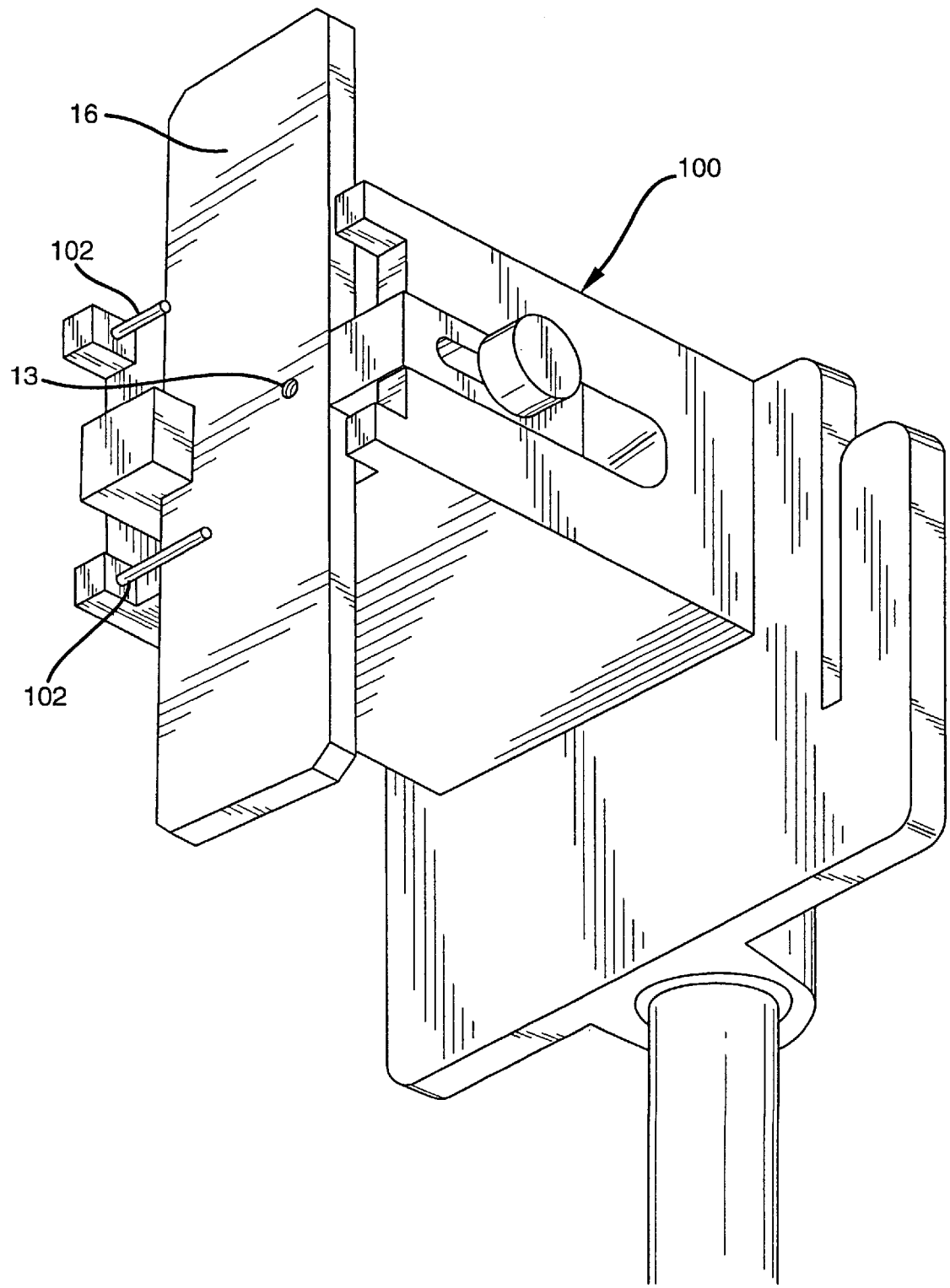
FIG. 3 is a perspective view of a substrate held in a holding fixture designed for assembling a blockless optical multiplexing device in accordance with an embodiment of the present invention.
Figure 4:
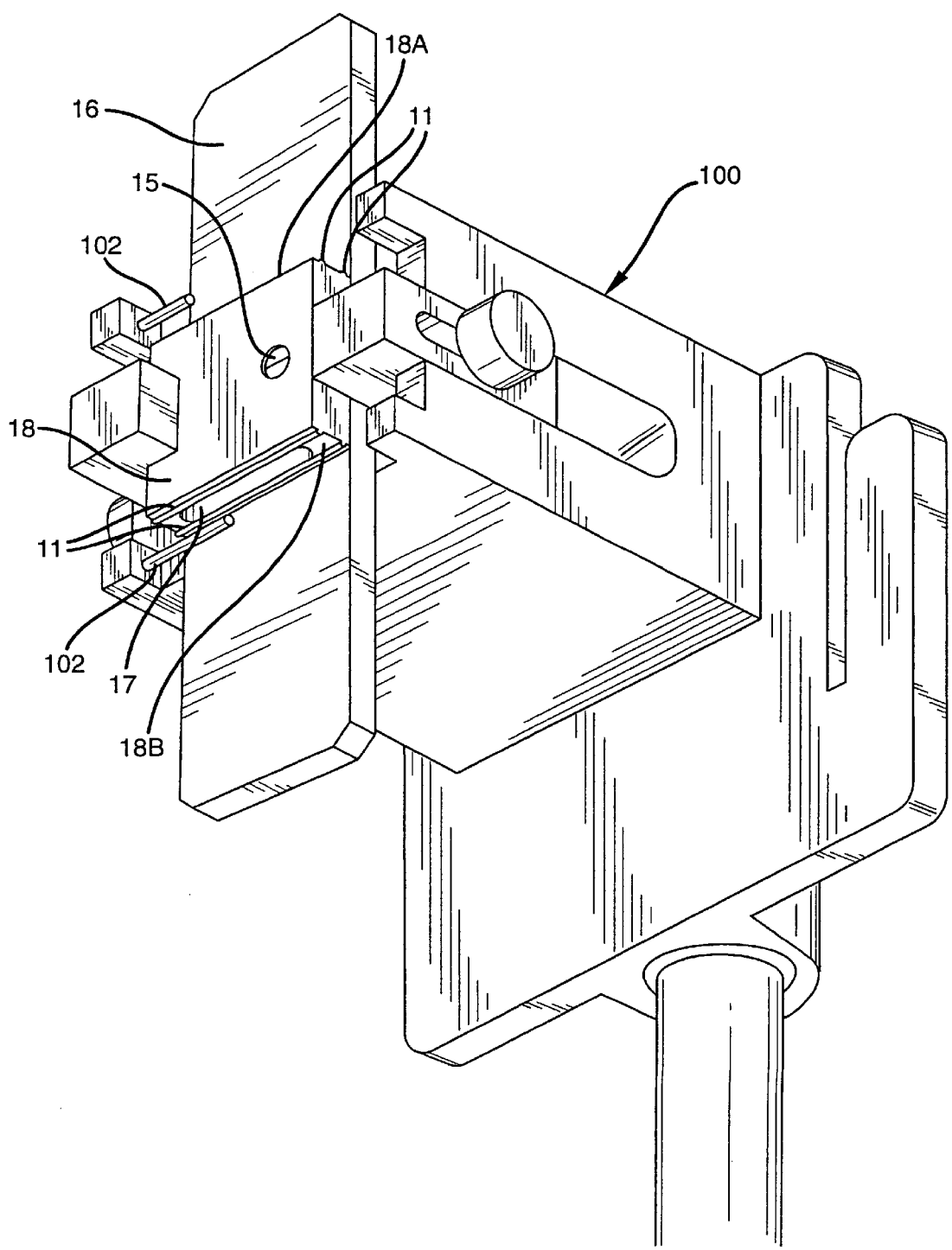
FIG. 4 is a perspective view of the substrate shown in FIG. 3 further showing an alignment fixture mounted thereon in accordance with an embodiment of the present invention.
Figure 5:
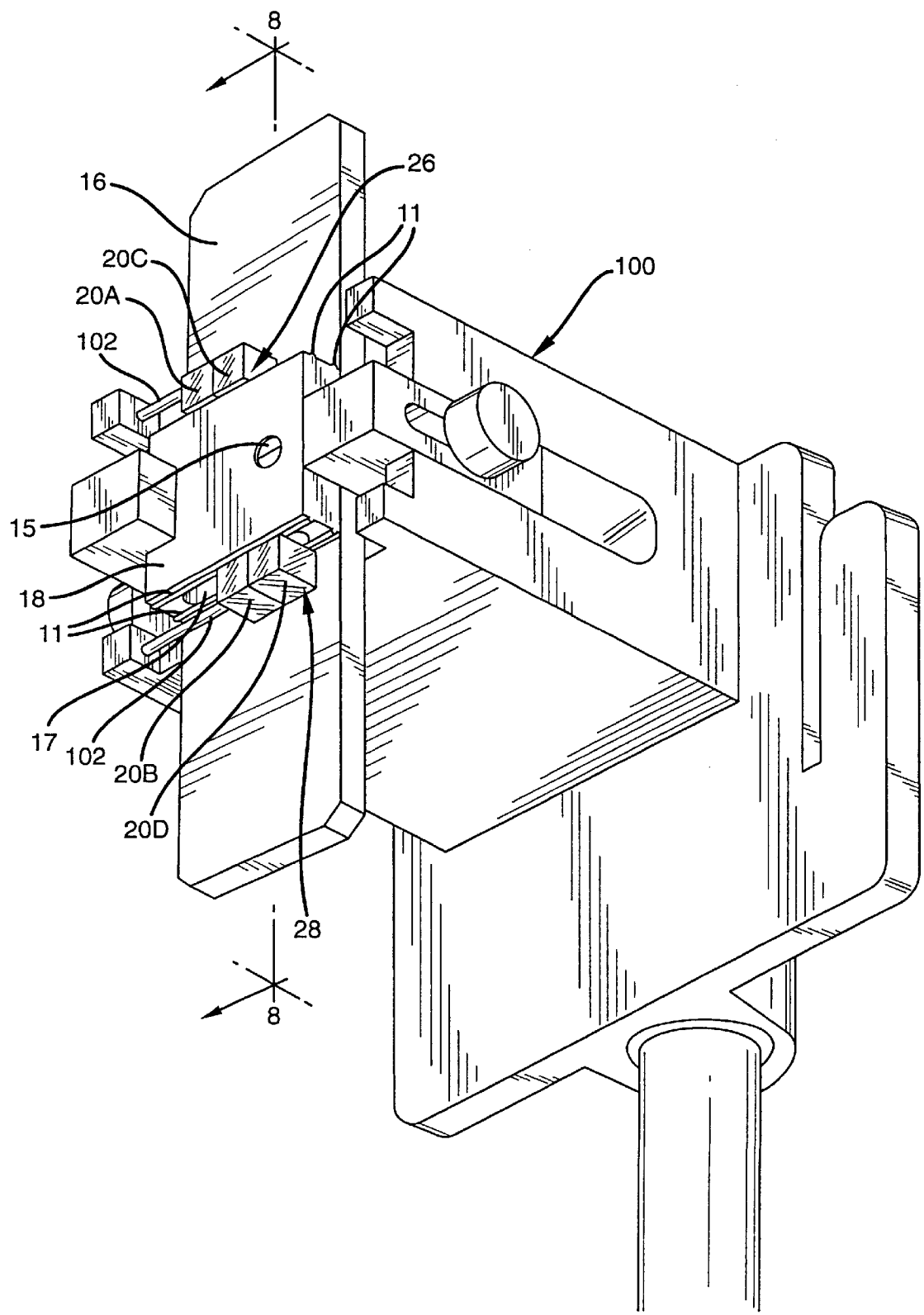
FIG. 5 is a perspective view of the substrate shown in FIG. 4 further showing a plurality of optical filters secured thereon in accordance with an embodiment of the present invention.
Figure 9:
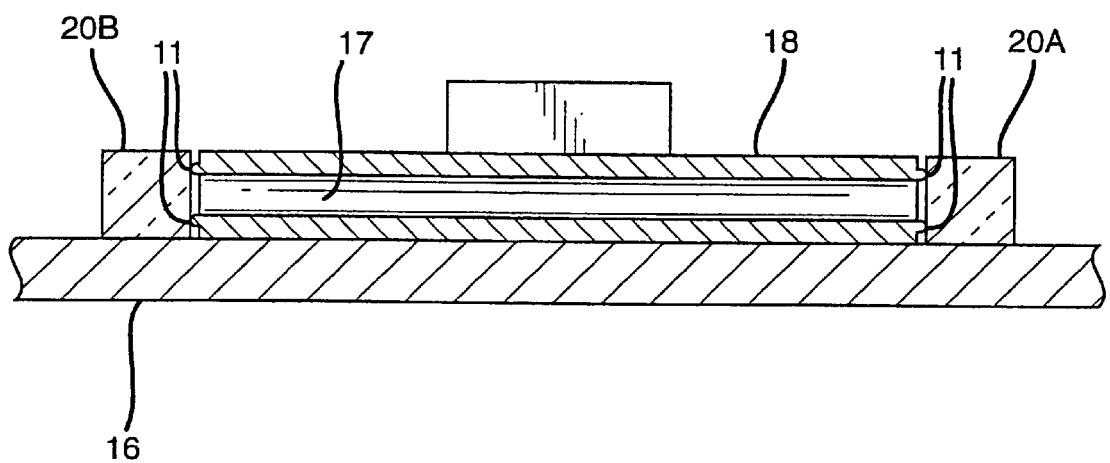
FIG. 9 is a side view of an alignment fixture in accordance with an embodiment of the present invention.

Accordingly, in a broad aspect, the invention provides a method of mounting N optical filters 20 onto a substrate 16, where N≧2, preferably, N=4, more preferably, N=8, and most preferably, N=16. The method comprises the steps of providing a holding fixture 100 (shown in FIGS. 3 and 4) for holding the substrate 16 in a vertical position for assembling each of the N optical filters 20 onto the substrate 16. The method further comprises removably attaching an alignment fixture 18 onto the substrate 16 (shown in FIG. 4). In a preferred embodiment, the substrate 16 is provided with a hole 13 (shown in FIG. 3), and the alignment fixture 18 is removably attached to the substrate 16 with a screw 15 that is screwed into the hole 13. Further, the alignment fixture 18 has a slot or opening 17 (shown in FIGS. 4, 5 and 9) that passes through one side 18A to an opposite second side 18B (shown in FIG. 4) of the alignment fixture 18. Furthermore, the alignment fixture 18 has a pair of rails 11 on each of the respective sides 18A and 18B, with one rail being on top of the opening 17 and the other rail being on the bottom of the opening 17 (as shown in FIGS. 4, 5 and 9). The method further comprises abuttingly aligning each of the N optical filters 20 to the alignment fixture 18, and securing each of the N optical filters 20 to the substrate 16 (as shown in FIG. 5), where each of the N optical filters 20 is precisely aligned in parallel with each other. The securing step includes the step of abuttingly aligning a first filter 20A of the N optical filters 20 against the rails 11 of the first side 18A of the alignment fixture 18, where the first 20A of the N optical filters 20 is precisely aligned to directly receive, at a geometric center, a collimated beam of multi-wavelength light at a desired angle of incidence. The securing step further includes applying a curable adhesive to secure a bottom surface 28 of the first 20A of the N optical filters 20 to the substrate 16, checking the parallelism of the first 20A of the N optical filters 20 to the alignment fixture 18 and curing the curable adhesive. The securing step further includes abuttingly aligning a second 20B of the N optical filters 20 against the rails 11 of the opposite second side 18B of the alignment fixture 18 and in parallel with the first 20A of the N optical filters 20 (as shown in FIG. 5), and applying a curable adhesive to secure a bottom surface 28 of the second 20B of the N optical filters 20 to the substrate 16, checking the parallelism of the second 20B of the N optical filters 20 to the first 20A of the N optical filters 20, and curing the curable adhesive. The securing step further includes abuttingly aligning a third 20C of the N optical filters 20 against the rails 11 of the first side 18A of the alignment fixture 18 and in parallel with each of the first 20A and second 20B of the N optical filters 20 (as shown in FIG. 5), applying a curable adhesive to secure a bottom surface 28 of the third 20C of the N optical filters 20 to the substrate 16, checking the parallelism of the third 20C of the N optical filters 20 to each of the first 20A and the second 20B of the N optical filters 20, and curing the curable adhesive. The securing step further includes abuttingly aligning a fourth 20D of the N optical filters 20 against the rails 11 of the second opposite side 18B and in parallel with each of the first 20A (as shown in FIG. 5), second and third 20C of the N optical filters 20, applying a curable adhesive to secure a bottom surface 28 of the fourth 20D of the N optical filters 20 to the substrate 16, checking the parallelism of the fourth 20D of the N optical filters 20 to each of the first 20A, second and third 20C of the N optical filters 20, and curing the curable adhesive. Finally, the method further comprises the step of removing the alignment fixture 18 from the substrate 16, whereby an air gap 19 (shown in FIG. 6), is created between one half (20A, 20C) of the N optical filters 20 and a second half (20B, 20D) of the N optical filters 20.

Figure 6:
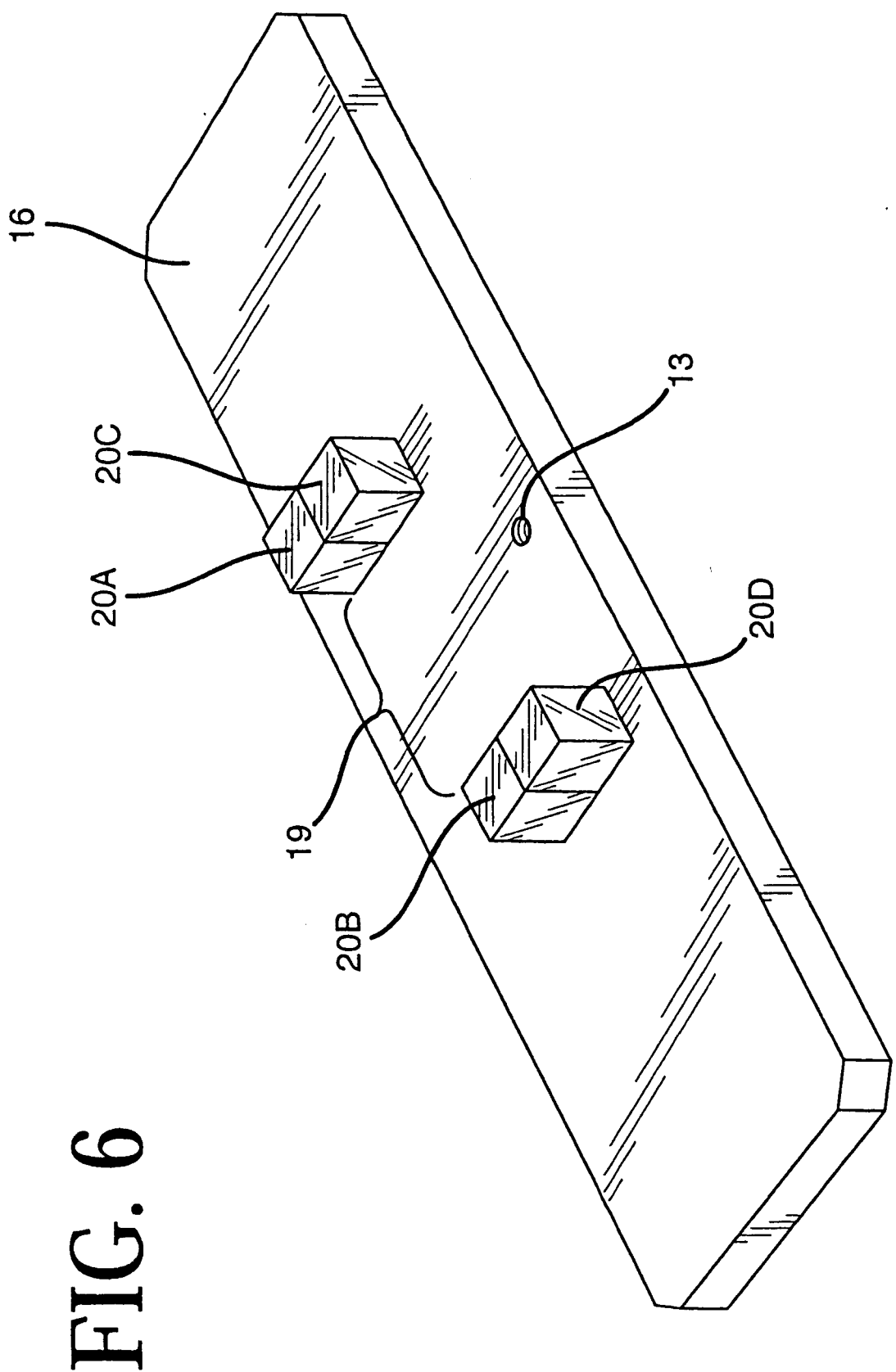
FIG. 6 is a schematic plan view of the substrate shown in FIG. 5 with the alignment fixture removed and without the holding fixture in accordance with an embodiment of the present invention.

In a preferred embodiment, the removably attaching step includes the step of selecting an alignment fixture 18 that is suitable for aligning each of the N optical filters 20 within a desired angle of incidence, and where the first side 18A and the second opposite side 20B of the alignment fixture 18 are substantially parallel to each other. Further, in a preferred embodiment, the holding fixture 100 includes two fixed cylindrical pins or rods 102 (shown in FIGS. 3–5) that are precisely positioned to allow for consistent alignment of the optical filters 20A–D onto the substrate 16. In particular, since the pair of filters 20A, 20C and 20B and 20D, respectively, are stacked one next to the other against the alignment fixture 18, the placement of the filters 20A and 20C on each side of the alignment fixture 18 is a critical step. Moreover, the critical parameters for the alignment of the filters 20A–D are their relative distances from each other on the substrate 16, and not the distances to the edges of the substrate 16. In this regard, both the alignment fixture 18 and the pins 102 on the holding fixture 100 provide the precise alignment of the filters 20A–D. Preferably, the screw hole 13 into which the screw 15 that secures the alignment fixture 18 to the substrate 16 is machined into the substrate 16. The actual positioning of the hole 13 on the substrate 16 has some tolerance. The way the filters 20A–D are aligned is that the filter 20A is first placed against the pin 102 and abutting against the first side 18A of the alignment fixture 18 and the filter 20C is placed against the pin 102 and abutting against the second side 18B of the alignment fixture 18. In particular, the pins 102 help offset the filters 20A and 20C from each other in the bounce path of the light beam, such that if the light beam hits filter 20A on the center at the proper AOI, the light also will hit filter 20C at its geometric center and so on. Then, the filter 20C is placed next to filter 20A and abutting the side 18A of the alignment fixture 18, and the filter 20D is placed next to the filter 20B and abutting the side 18B of the alignment fixture 18. Moreover, the opening 17 in the alignment fixture 18 aids in being able to visually see through the alignment fixture 18 and in visually aligning each of the filters 20A and 20C on side 18A in parallel with the filters 20B and 20D on side 18B of the alignment fixture 18. In a preferred embodiment, the checking step includes the step of checking the parallelism of each of the N optical filters 20 with an interferometer. Each of the filters 20 is adjusted for parallelism, preferably the parallelism is kept to as close to zero fringes as possible. Also, in a preferred embodiment, each of the respective first 20A and third 20C of the N optical filters 20 are abutted against and parallel to each other on one side of the air gap 19 (as shown in FIG. 6), and wherein each of the respective second and fourth 20D of the N optical filters 20 are abutted against and parallel to each other on an opposite side of the air gap 19, with the number N of optical filters 20 being equal to a number of optical channels desired. Moreover, in a preferred embodiment, each of the curing steps includes exposing the substrate 16 to a high intensity ultra-violet light for preferably approximately 30 seconds for curing the curable adhesive, which in a preferred embodiment is an epoxy.

In another aspect, the invention provides a method of assembling a blockless optical multiplexing device 10 having N sub-assemblies, where N≧1. The method comprises the steps of removably attaching an alignment fixture 18 onto a substrate 16 of each of the N sub-assemblies, precisely aligning each of a plurality of optical filters 20 in parallel with each other and abutting against either one of two opposite sides of the alignment fixture 18 of each of the N sub-assemblies, preferably, with one half of the plurality of optical filters 20 abutting against one side of the alignment fixture 18 and with the other half of the plurality of optical filters 20 abutting against the other side 18B of the alignment fixture 18. The method further comprises securing each of the plurality of optical filters 20 to the respective substrate 16 of each of the N sub-assemblies, where each of the plurality of optical filters 20 are precisely aligned in parallel with each other on the respective substrates 16 of each of the N sub-assemblies. The method further comprises the step of removing the alignment fixture 18 from the substrate 16 of each of the N sub-assemblies, such that an air gap 19 is created in between the plurality of optical filters 20 on each of the sub-assemblies. The air gap 19 is created where the alignment fixture 18 was attached originally. The method further comprises the steps of fastening, to the substrate 16 of each of the N sub-assemblies, an input collimator 22 that is aligned to transmit a collimated beam of multi-wavelength light to a first one 20A of the plurality of optical filters 20, and affixing each of a plurality of output collimators 24 to the substrate 16 of each of the N sub-assemblies, where a respective one of the plurality of output collimators 24 is aligned with a respective one of the plurality of optical filters 20, preferably, each of the output collimators 24 being positioned behind each of the associated filters 20. In addition, the method comprises mounting each of the N sub-assemblies onto a main assembly unit, wherein the output end of a preceding one of the N sub-assemblies is optically connected to the input end of a succeeding one of the N sub-assemblies, such that a collimated beam of multi-wavelength light can be transmitted through the air gap 19 and through a geometric center of each of the plurality of optical filters 20 in a cascading path on each of the N sub-assemblies of the optical multiplexing device 10.

In a preferred embodiment, the removably attaching step includes the steps of: providing a holding fixture 100 for holding the substrate 16 of each of the N sub-assemblies in a vertical position and further selecting an alignment fixture 18 that is suitable for aligning in parallel each of the N optical filters 20, such that the collimated beam of multi-wavelength light is incident to the geometric center of each of the plurality of optical filters 20 at a desired angle of incidence. In a preferred embodiment, the precisely aligning step includes the steps of aligning each of the filters with respect to the rods 102 of the holding fixture 100 and with respect to the rails 11 of the alignment fixture 18, and applying a curable adhesive to secure a bottom surface 28 of each of the optical filters 20 to the respective substrate 16, and measuring the parallelism of each of the optical filters 20 in relation to each other, preferably, with an interferometer. Further, in a preferred embodiment, the securing step includes the step of curing the curable adhesive, preferably, by exposing each of the respective substrates 16 to a high intensity ultra-violet light for approximately 30 seconds. In a preferred embodiment, the number N of sub-assemblies in the optical multiplexing device 10 is 4, where each of the 4 sub-assemblies comprises, among other optical components, preferably, 4 optical filters 20, 4 input collimator 22 and 4 output collimators 24, thus, providing a blockless optical multiplexing device 10 having a total of preferably 16 optical channels.

The invention also provides a method of making a thin film optical telecommunications multiplexing device having N optical channels, N≧2, the method comprising the steps of temporarily attaching an alignment fixture 18 onto each one of a plurality of substrates 16. For each one of the plurality of substrates 16, abuttingly aligning one of a plurality of optical filters 20 against one of two opposite sides of the alignment fixture 18 and measuring the angle of incidence that an incident beam of test light makes with the one of the plurality of optical filters 20 on each of the substrates 16. If a desired angle of incidence is not present, making adjustments to the alignment of the one of the plurality of optical filters 20. However, if the desired angle of incidence is present, permanently securing the one of the N optical filters 20 to each of the respective substrates 16. For each of a subsequent one of the plurality of optical filters 20, repeating the steps of abuttingly aligning the subsequent one of the optical filters 20 against the alignment fixture 18 and measuring the angle of incidence that an incident beam of test light makes with the subsequent one of the plurality of optical filters 20 on each of the substrates 16. If a desired angle of incidence is not present, making adjustments to the alignment of the subsequent one of the plurality of optical filters 20. However, if the desired angle of incidence is present, permanently securing the subsequent one of the N optical filters 20 to each of the respective substrates 16, such that one-half of the plurality of optical filters 20 abut against the one 18A of the two opposite sides of the alignment fixture 18 and the other half of the plurality of optical filters 20 abut against the other 18B of the two opposite sides of the alignment fixture 18.

In a preferred embodiment, for each of the plurality of substrates 16, the abuttingly aligning step includes the steps of aligning each of the filters with respect to the rods 102 of the holding fixture 100 and with respect to the rails 11 of the alignment fixture 18, and applying a curable adhesive to secure a bottom surface 28 of each of the plurality of optical filters 20 to a respective one of the plurality of substrates 16. Further, each of the plurality of substrates 16, the permanently securing step includes the step of curing the curable adhesive by exposing the respective substrates 16 to a 30-second high intensity ultra-violet light. The method further comprises removing the alignment fixture 18 from each of the plurality of substrates 16 after each of the plurality of optical filters 20 are secured to the respective substrates 16 and securing an input collimator 22 onto each of the substrates 16, where the input collimator 22 is precisely aligned to direct a collimated multi-wavelength light at the desired angle of incidence. In addition, the method includes securing a plurality of output collimators 24 onto each of the substrates 16, where a respective one of the output collimators 24 is aligned with respect to an associated one of the optical filters 20, such that the collimated beam of the multi-wavelength light can be transmitted through an air gap 19 and through a geometric center of each of the N optical filters 20 in a cascading path on each of the plurality of substrates 16.

Further, filter 20D is not necessarily required for the last (downstream) channel in the optical multiplexing device 10, when used in a demultiplexing mode, if all other channels or wavelengths already have been removed (by other, upstream filters) from the multi-channel light received into the air gap 19. In this regard, filter 20D is placed on the substrate 16 to clean up the signal, and is not required on all optical multiplexing devices 10. Similarly, in a multiplexing mode or embodiment, a filter element is not necessarily required at the first (upstream) channel, where there is no need to selectively reflect away any other wavelengths at that port. In those embodiments of the multiplexing device of the invention which are for both multiplexing and demultiplexing, a filter element is used at each location along the light path through the air gap 19 where a selected wavelength sub-range must be passed into or out of the air gap 19 and other wavelengths must be reflected back into the air gap 19 to travel further upstream or downstream along the light path.

In a preferred embodiment, during the step of securing an input optical collimator 22 to the substrate 16, a laser light is pumped down through the input collimator 22 and laser detectors are placed at the output end of each of the filters 20A–D. The input collimator 22 is mounted in a chuck with precision control knobs on an alignment bench. A technician manually adjusts the horizontal and vertical position of the input collimator 22 until the proper signal is achieved at the output ends of each of the filters 20A–D. Then each of the output collimators 24 are mounted onto the substrate 16, such that output collimator 24A is aligned with filter 20A, output collimator 24B is aligned with filter 20B, output collimator 24C is aligned with filter 20C, and output collimator 24D is aligned with filter 20D. In particular, each of the output collimators 24A–D has a pigtail fiber that can be plugged into a light meter for measuring the amount of light passing through the individual collimator. Thus, the output collimator 24A is secured to the substrate 16 in a precise alignment that allows a maximum light at a desired wavelength to be passed through it. This alignment process is repeated for each of the remaining output collimators 24B–D.

The method further comprises hermetically sealing each one of the plurality of substrates 16 in a housing to form a plurality of individual units, and mounting each one of the units onto a larger substrate, with an output end of a preceding one of the plurality of units being optically connected to an input end of a subsequent one of the plurality of units. In a preferred embodiment, the number of optical filters 20 and the number of output collimators 24 on all of the substrates 16 combined is equal to the number of optical channels N making up the optical multiplexing device, where N is preferably 4, more preferably N is 8, and most preferably N is 16. In a preferred embodiment, each of the substrates 16 have an equal number of optical filters 20 and output collimators 24, with the total number of optical filters 20 being equal to the total number of output collimators 24, which in turn dictates the total number N of optical channels in the multiplexing device 10.

The present invention provides a method for mounting the optical filters 20 directly onto the substrate 16 instead of the alignment fixture 18, thus, eliminating the need for the alignment fixture 18 in the optical multiplexing device 10. Instead, the alignment fixture 18 is used only as a reference during the mounting of the filters 20, and is removed from the optical multiplexing device 10 after the filters 20 have been securely aligned to the substrate 16. The alignment fixture 18 is chosen to correspond to a filter kit with a specific angle of incidence, ensuring that the collimated beam of light 21 from the input collimator 22 will land on the geometric center of each of the optical filters 20A–D, respectively. In a preferred embodiment, a different alignment fixture 18 is provided for each desired angle of incidence for making different optical multiplexing devices 10, thus, ensuring that the initial single collimated beam of light 21 hits each optical filter 20A–20D in the geometric center at the desired angle of incidence for all the filters 20A–D in a given optical multiplexing device 10. In a preferred embodiment, the substrate 16 and the alignment fixture 18 are both made of stainless steel. Further, each of the thin film filters 20 is produced by commercially known plasma deposition techniques, such as ion assisted electron beam evaporation, ion beam sputtering, reactive magnetron sputtering, e.g., as disclosed in U.S. Pat. No. 4,851,095 to Scobey et al and in U.S. Pat. No. 5,525,741 to Scobey, and is commercially available from Corning Optical Corporation of America located in Marlborough, Mass. and each of the input and output collimators 22 and 24, respectively, is commercially available from Siecor Corporation.

The present invention has several advantages, including decreased overall device cost given that the alignment fixture 18 is omitted, and a quicker assembly time given that the five hours curing cycle time associated with attaching the filters to the sides of the alignment fixture 18 are replaced with a few minutes exposure of a high intensity ultra-violet light, thus, simplifying product flow and process management issues. Further, the high-intensity ultra-violet light step provides immediate feedback of the filter parallelism and flatness. Furthermore, the process of securing the filters 20 to the substrate 16, that is, by applying an ultra-violet curable or thermally cured adhesive, preferably, epoxy to the bottom edge 28 (shown in FIG. 5) of the filter 20 in contact with only the substrate 16 and not to the alignment fixture 18 provides increased contact area for uniformly bonding the filters 20 to the substrate 16 and, therefore, providing a stronger bond. Additionally, the lack of applying any microsphere solution and/or adhesive on the surfaces of the filters 20 reduces the chance of contaminating the optical path. Another advantage of the blockless optical multiplexing device 10 is that it provides easier access to the faces of the filters 20 for cleaning during assembly, since the alignment fixture 18 is removed. Also, the blockless optical multiplexing device 10 provides greater flexibility in changing or reworking the alignment of one or more of the filters 20, for instance, adjusting the AOI to meet the center wavelength target when necessary, as opposed to starting from the start, thus, providing a better opportunity to address any angle of incidence errors during assembly. Also, the blockless optical multiplexing device 10 eliminates or minimizes the effects of non-uniform stress caused in the thin film filters 20 as a result of thermal expansion of the alignment fixture 18 and center wavelength drift during the curing process, resulting in a lower PDL. Also, the current design with the two parallel rails 11 that protrude from the sides 18A and 18B of the alignment fixture 18 significantly reduce the surface area in contact with the filters 20. The smaller surface is easier to maintain and polish, plus, the filter mount process is much faster and simpler. Since the filter is no longer glued to the alignment fixture, the reduced side surface area of the alignment fixture 18 as a result of the protruding rails 11 does not present any problems. Additionally, the employment of one of an array of variously dimensioned alignment fixtures 18 with a chosen filter kit having one of many possible angles of incidence (AOI), thus, minimizes losses due to AOI error.

Although a preferred embodiment of this invention has been described herein, various modifications and variations of the invention will be apparent to those skilled in the art without departing from the spirit or scope of the invention. For instance, a blockless optical multiplexing device 10 having N number of optical channels can be constructed in accordance with the invention described herein, where N=32. Additionally, instead of aligning each of the optical filters 20 in sequence and then securing them to the substrate 16, the optical filters 20 can be aligned with each other and then simultaneously secured to the substrate 16. Alternatively, the other optical components, namely, the input and output collimators 24 can be aligned with the respective optical filters 20 on the substrate 16 and the optical filters 20, input and output collimators 24 can be simultaneously secured to each one of one or more substrates 16 before removing the alignment fixture 18. Thus, it is intended that the present invention cover the modifications and variations of this invention provided they come within the scope of the appended claims and their equivalents.

What is claimed is:

1. A method of mounting N optical filters onto a substrate, N≧2, said method comprising the steps of:
   removably attaching an alignment fixture onto said substrate;
   abuttingly aligning each of said N optical filters to said alignment fixture;
   securing each of said N optical filters to said substrate, each of said N optical filters being precisely aligned in parallel with each other; and
   removing said alignment fixture from said substrate.

2. The method of claim 1, wherein said step of removably attaching includes the step of:
   providing a holding fixture for holding said substrate in a vertical position for assembling said optical filters.

3. The method of claim 1, wherein said step of removably attaching includes the steps of:
   selecting an alignment fixture that is suitable for aligning in parallel each of said N optical filters, whereby a collimated beam of multi-wavelength light is incident to a geometric center of each of said N optical filters at a desired angle of incidence.

4. The method of claim 1, wherein N is 4.

5. The method of claim 3, wherein said securing step includes the step of:
   abuttingly aligning a first of said N optical filters against a first side of said alignment fixture;
   applying a curable adhesive to secure a bottom surface of said first of said N optical filters to said substrate;
   checking the parallelism of said first of said N optical filters to said alignment fixture; and
   curing said curable adhesive.

6. The method of claim 5, wherein said checking step includes the step of:
   checking the parallelism of said first of said N optical filters to said alignment fixture with an interferometer.

7. The method of claim 6, wherein said curing step includes the step of:
   exposing said substrate to a high intensity ultra-violet light for curing said curable adhesive.

8. The method of claim 7, wherein said securing step includes the step of:
   abuttingly aligning a second of said N optical filters against an opposite second side of said alignment fixture and in parallel with said first of said N optical filters;
   applying a curable adhesive to secure a bottom surface of said second of said N optical filters to said substrate;
   checking the parallelism of said second of said N optical filters to said first of said N optical filters; and
   curing said curable adhesive.

9. The method of claim 8, wherein said securing step includes the step of:
   abuttingly aligning a third of said N optical filters against said first side of said alignment fixture and in parallel with each of said first and second of said N optical filters;
   applying a curable adhesive to secure a bottom surface of said third of said N optical filters to said substrate;
   checking the parallelism of said third of said N optical filters to each of said first and said second of said N optical filters; and
   curing said curable adhesive.

10. The method of claim 9, wherein said securing step includes the step of:
  abuttingly aligning a fourth of said N optical filters against said second side and in parallel with each of said first, second and third of said N optical filters;
  applying a curable adhesive to secure a bottom surface of said fourth of said N optical filters to said substrate;
  checking the parallelism of said fourth of said N optical filters to each of said first, second and third of said N optical filters; and
  curing said curable adhesive.

11. A method of assembling a blockless optical multiplexing device having N sub-assemblies, N≧1, said method comprising the steps of:
  removably attaching an alignment fixture onto a substrate of each of said N sub-assemblies;
  precisely aligning each of a plurality of optical filters in parallel with respect to each other, each of said optical filters being abutted against one of two opposite sides of said alignment fixture on each of said N sub-assemblies;
  securing each of said plurality of optical filters to said substrate of each of said N sub-assemblies;
  removing said alignment fixture from said substrate of each of said N sub-assemblies, whereby an air gap is created in between said plurality of optical filters;
  fastening, to said substrate of each of said N sub-assemblies, an input collimator aligned to transmit a collimated beam of multi-wavelength light to a first one of said plurality of optical filters;
  affixing each of a plurality of output collimators to said substrate of each of said N sub-assemblies, one of said plurality of output collimators being aligned with respect to an associated one of said plurality of optical filters; and
  mounting each of said N sub-assemblies onto a main assembly unit, wherein the output end of a preceding one of said N sub-assemblies is optically connected to the input end of a succeeding one of said N sub-assemblies on said main assembly unit, wherein a collimated beam of multi-wavelength light may be transmitted in a cascading path through said air gap and through a geometric center of each of said plurality of optical filters on each of said N sub-assemblies of said optical multiplexing device.

12. The method of claim 11, wherein said removably attaching step includes the step of:
  providing a holding fixture for holding said substrate of each of said N sub-assemblies in a vertical position.

13. The method of claim 12, wherein said removably attaching step includes the step of:
  selecting an alignment fixture that is suitable for aligning in parallel each of said N optical filters, whereby said collimated beam of multi-wavelength light is incident to said geometric center of each of said plurality of optical filters at a desired angle of incidence.

14. The method of claim 13, wherein said precisely aligning step includes the steps of:
  precisely aligning each of a plurality of said optical filters in parallel with respect to each other, each of said optical filters being abutted against one of two opposite sides of said alignment fixture, wherein one half of said optical filters are abutting against one of said two opposite sides of said alignment fixture and wherein a second half of said optical filters are abutted against the other of said two opposite sides of said alignment fixture;
  applying a curable adhesive to secure a bottom surface of each of said optical filters to said substrate; and
  measuring the parallelism of each of said plurality of optical filters with respect to each other.

15. The method of claim 14, wherein said securing step includes the step of:
  curing said curable adhesive.

16. The method of claim 15, wherein N is 4.

17. A method of making a thin film optical telecommunications multiplexing device having N optical channels, N≧2, said method comprising the steps of:
  a) temporarily attaching an alignment fixture onto each one of a plurality of substrates;
  b) for each one of said plurality of substrates, abuttingly aligning one of a plurality of optical filters against one of two opposite sides of said alignment fixture;
  c) for each one of said plurality of substrates, measuring the angle of incidence that an incident beam of test light makes with said one of said plurality of optical filters;
  d) for each one of said plurality of substrates, if a desired angle of incidence is not present, making adjustments to the alignment of said one of said plurality of optical filters;
  e) for each one of said plurality of substrates, if said desired angle of incidence is present, permanently securing said one of said plurality of optical filters;
  f) repeating steps b through e for a subsequent one of said plurality of optical filters, whereby each of said subsequent one of said optical filters is abuttingly secured on said one of two sides of said alignment fixture in an alternating fashion for each one of said plurality of substrates;
  g) when said plurality of optical filters are secured to each one of said plurality of substrates, removing said alignment fixture from each one of said plurality of substrates;
  h) securing an input collimator onto each one of said plurality of substrates, said input collimator being precisely aligned to direct a collimated beam of multi-wavelength light at said desired angle of incidence; and
  i) securing a plurality of output collimators onto each one of said plurality of substrates, one of said plurality of output collimators being aligned with respect to an associated one of said plurality of optical filters secured thereon; wherein said collimated beam of multi-wavelength light may be transmitted through an air gap and through a geometric center of each of said plurality of optical filters in a cascading path on each one of said plurality of substrates.

18. The method of claim 17, wherein said temporarily attaching step includes the step of:
  providing an alignment fixture having a slot traversing said fixture from one side to an opposite side, and having a pair of parallel rails protruding from each of said sides, one of said pair of parallel rails being on top of said slot and the other of said pair of parallel rails being on the bottom of said slot on each of said sides.

19. The method of claim 17, wherein said abuttingly aligning step includes the steps of:
  for each one of said plurality of substrates, abuttingly aligning one of a plurality of optical filters with respect to a pin protruding from a holding fixture and against one of two opposite sides of said alignment fixture; and
  for each one of said plurality of substrates, applying a curable adhesive to secure a bottom surface of each of said plurality of optical filters to a respective one of said plurality of substrates.

20. The method of claim 19, wherein said permanently securing step includes the step of:

curing said curable adhesive.

21. The method of claim 20, further comprising the step of:

hermetically sealing each one of said plurality of substrates in a housing to form a plurality of units; and mounting each one of said units onto a main substrate, wherein an output end of a preceding one of said plurality of units is optically connected to an input end of a subsequent one of said plurality of units.

22. The method of claim 21, wherein the number of said plurality of optical filters and the number of said plurality of output collimators on said optical multiplexing device is each equal to the number N of optical channels.

23. The method of claim 22, wherein N is equal to 4.

24. The method of claim 22, wherein N is equal to 8.

25. The method of claim 22, wherein N is equal to 16.

26. The method of claim 22, wherein said plurality of substrates comprises 2.

27. The method of claim 22, wherein said plurality of substrates comprises 3.

28. The method of claim 22, wherein said plurality of substrates comprises 4.

29. A blockless optical multiplexing device made by the process of claim 25.

* * * * *